(12) United States Patent
Aoki

(10) Patent No.: US 8,585,015 B2
(45) Date of Patent: Nov. 19, 2013

(54) ENGAGEMENT CHAIN

(75) Inventor: Toshihiko Aoki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 457 days.

(21) Appl. No.: 12/625,165

(22) Filed: Nov. 24, 2009

(65) Prior Publication Data

US 2010/0140572 A1 Jun. 10, 2010

(30) Foreign Application Priority Data

Dec. 9, 2008 (JP) ................................ 2008-313003

(51) Int. Cl.
*B66F 13/00* (2006.01)
*B66D 1/20* (2006.01)
*B66F 1/00* (2006.01)
*F16G 13/04* (2006.01)

(52) U.S. Cl.
USPC ............... 254/1; 254/358; 254/385; 474/212; 474/213; 474/215

(58) Field of Classification Search
USPC ............... 254/1, 311, 122, 124, 126, 97, 103, 254/385; 474/212, 206, 213, 201, 202, 210; D8/499
See application file for complete search history.

(56) References Cited

U.S. PATENT DOCUMENTS

| | | | |
|---|---|---|---|
| 5,690,571 A * | 11/1997 | Mott | 474/212 |
| 5,967,926 A * | 10/1999 | Kozakura et al. | 474/213 |
| 6,485,385 B2 * | 11/2002 | Shimaya | 474/213 |
| 6,733,410 B2 * | 5/2004 | Saito | 474/212 |
| 7,201,687 B2 * | 4/2007 | Mott et al. | 474/157 |
| 8,088,029 B2 * | 1/2012 | Tohara et al. | 474/212 |
| 2002/0155911 A1 * | 10/2002 | Hummel et al. | 474/212 |
| 2003/0125146 A1 | 7/2003 | Saitoh | |
| 2008/0315168 A1 * | 12/2008 | Takeuchi et al. | 254/358 |
| 2009/0000852 A1 * | 1/2009 | Paul | 180/373 |
| 2009/0118048 A1 * | 5/2009 | Takashima et al. | 474/215 |
| 2009/0156342 A1 | 6/2009 | Matsuda | |
| 2011/0101294 A1 * | 5/2011 | Yaoi et al. | 254/385 |

FOREIGN PATENT DOCUMENTS

| | | |
|---|---|---|
| JP | 11-278797 A | 10/1999 |
| JP | 2001-254796 | 9/2001 |
| JP | 2001-263434 | 9/2001 |
| JP | 3370928 B2 | 1/2003 |
| JP | 2005-076883 | 3/2005 |
| WO | 2007/007616 | 1/2007 |

\* cited by examiner

*Primary Examiner* — Monica Carter
*Assistant Examiner* — Seahee Yoon
(74) *Attorney, Agent, or Firm* — Maschoff Brennan

(57) ABSTRACT

There is provided an engagement chain whose driving force per occupied space is increased, whose durability is improved by reducing stress in a direction of bending a connecting pin and whose engagement noise during driving is reduced. The engagement chain includes a large number of outer and inner link plates, each having hook-like portions, which are connected in a chain longitudinal direction by connecting pins, the large number of outer and inner link plates are connected flexibly without gap in the chain width direction while the back surfaces of the link plates opposite to the hook-like portions engage with driving sprockets.

8 Claims, 9 Drawing Sheets

ENGAGEMENT CHAIN

CROSS-REFERENCES AND RELATED APPLICATIONS

This application claims the foreign priority benefit under Title 35, United States Code, §119 (a)-(d) of Japanese Patent Application No. 2008-313003, filed on Dec. 9, 2008 in the Japan Patent Office, the disclosure of which is herein incorporated by reference in its entirety.

BACKGROUND OF THE INVENTION

1. Technical Field

The present invention relates to an engagement chain built into a driving system for moving an object in parallel with an installation surface. More specifically, the present invention relates to an engagement chain for a driving system for use in manufacturing facilities in various manufacturing fields, transfer facilities in the transportation field, nursing care facilities in the health-care and welfare fields, stage facilities in the performing art filed and the like.

2. Related Art

Driving systems are currently used for lifting an object which needs to be moved such as a heavy load using a pair of engagement chains, which are commonly referred to as chuck chains. The engagement chains engage with each other as the chains are moved up and down. For example, one such engagement chain is shown in Japanese Patent Publication No. 3370928.

As shown in FIGS. 8 and 9, the engagement chain 500 has inner link units which include a pair of front and rear bushes 530 which are press-fitted into a pair of inner link plates 510. Each inner link plate has a hook-like portion 511. A pair of outer link plates 520 are disposed respectively outside the inner link units in a width direction of the chain, herein referred to as the "chain width direction." The outer link plates 520 each have a pair of front and rear pin holes and a hook-like portion 521.

The engagement chain is built by connecting the large number of inner link units together in a longitudinal direction, hereinafter referred to as the "chain longitudinal direction," by press-fitting a pair of front and rear connecting pins 531 into the pair of front and rear pin holes of the outer link plates 520 with the front and rear connecting pins 531 extending through the bushes 530 of the inner link units.

Each bushing 530 has a roller 532 fitted around it. The rollers 532 engage with a pair of driving sprockets 501 disposed so as to face to each other, so that when the driving sprockets are driven, the engagement chains 500 are driven so as to integrally engage with an opposing portion of the chain by causing the hook-like portions 511 of the inner link plates 510 and the hook-like portions 521 of the outer link plates 520 to face to each other in the chain longitudinal direction so as to integrate the chain when the chain is driven from a horizontal direction to a vertical direction.

The respective engagement chains 500 are moved as the pair of driving sprockets 501 come into slidable contact with the rollers 532 of the chain which is pressed against a chain guide 502.

One problem with this configuration, however, is that because the rollers 532 transmit the driving force by engaging with the driving sprocket 501, the engagement chains 500 require spaces where the inner and outer link plates 510 and 520 do not exist in order for the driving sprockets to come into contact with the rollers 532. Thus, in order for the driving force to be transmitted to the chain in the chain longitudinal direction, the spaces occupied by the engagement chains 500 has to be relatively large.

The engagement chain 500 also has had a problem when the driving force transmitted from the driving sprocket 501 to the roller 532 is also transmitted to the pair of right and left inner link plates 510 or the outer link plates 520, as the stress is transferred from the roller to the center part of the connecting pin 531. This can result in a large stress and shearing force, causing bending in the connecting pin 531, thus lowering durability of the chain.

Furthermore, the engagement chain 500 has had a problem that because the rollers 532 engage with the driving sprocket 501 by colliding against teeth of the driving sprocket 501 from a radial direction when the driving sprocket 501 is rotated, the engagement chain 500 generates a large engagement noise during driving.

Accordingly, there is a need for an engagement chain whose driving force per occupied space is increased, whose durability is improved by reducing bending stress and shearing force otherwise acting on connecting pins and whose engagement noise during driving is reduced.

BRIEF SUMMARY OF THE INVENTION

A first aspect of the invention solves the aforementioned problems providing an engagement chain including a pair of individual engagement chains which are configured so as to engage and disengage with each other. Each individual engagement chain comprises a plurality of outer and inner link plates, each having a hook-like portion, which are connected together in a chain longitudinal direction by connecting pins, wherein the pair of individual engagement chains are engaged and disengaged as the hook-like portions of each individual engagement chain engage with each other and are driven by a pair of driving sprockets which engage with a back-surface of each of the outer and inner link plates, causing the pair of individual engagement chains to engage and disengage with each other, respectively.

The engagement chain of the invention each is capable of efficiently transferring the driving force so that an object can be lifted quickly at constant speed by rotating the driving sprockets. That is, a transversal size of the engagement chain of the invention may be reduced as compared to the prior art roller chain type driving system.

Still more, because the driving force transmitted from the driving sprocket acts equally in the width direction of the connecting pin from the outer and inner link plates, the stress in the direction of bending the connecting pin may be reduced and the shearing force applied to the connecting pin may be dispersed and reduced as compared to the shearing force applied to the roller chain type driving system, thus improving the durability of the chain.

Further, because the shapes of the back surface of the hook-like portion and the driving sprocket may be arbitrarily designed, it is possible to reduce the engagement noise otherwise generated during driving by making them into shapes that causes no collision during engagement.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail, so as to describe the invention. As may be understood by one of skill in the art, however, the embodiments described herein may be modified without departing from the scope and meaning of the claims. As such, the following embodiments are illustrative only and do not limit the scope of the claims.

Embodiment 1

Figure 1:
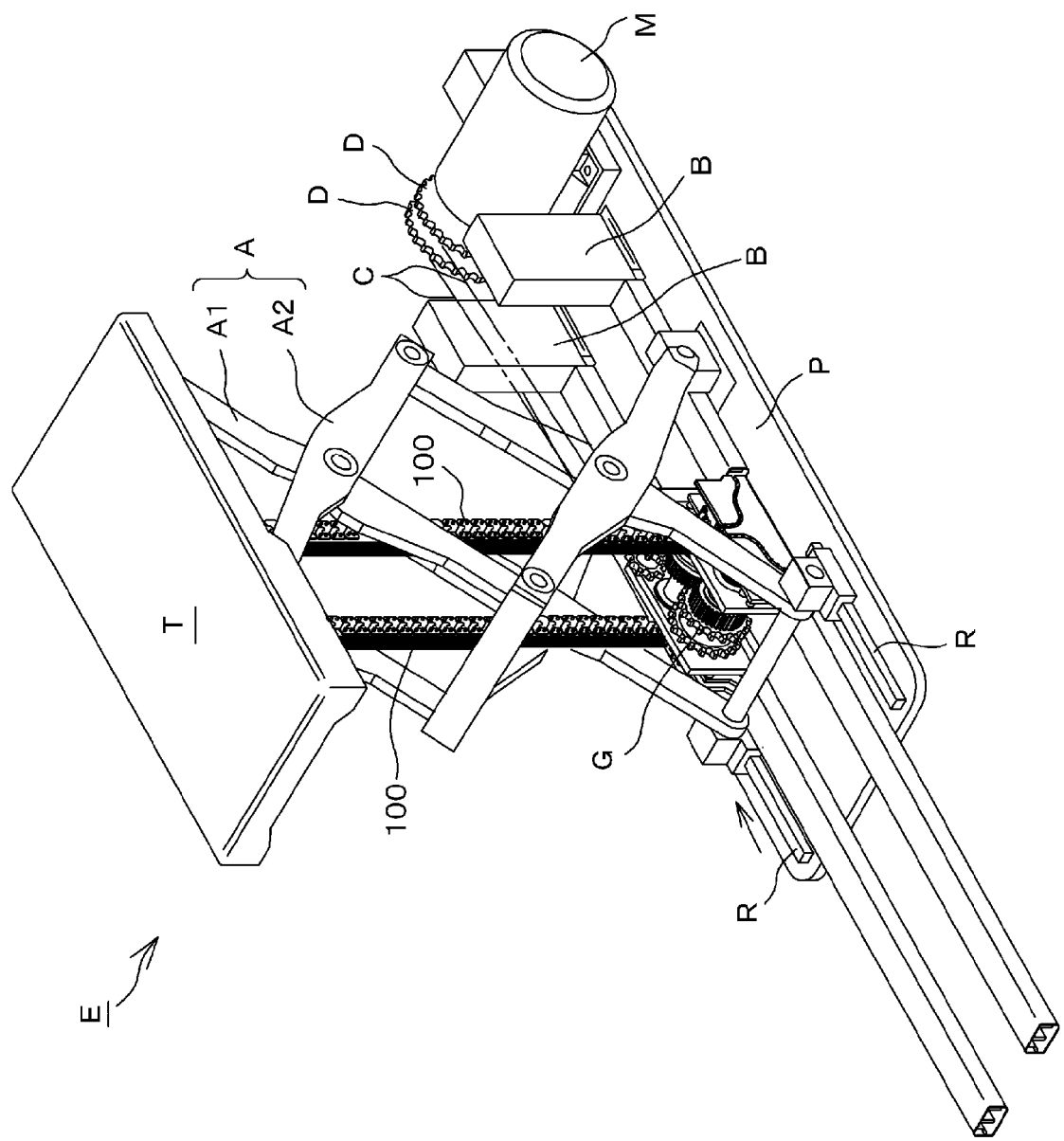
FIG. 1 is a perspective view showing a mode of use of an engagement chain of one embodiment of the invention.

The engagement chain of a first embodiment of the invention will be explained with reference to the drawings. FIG. 1 is a perspective view showing a mode of use of the engagement chain according to the first embodiment of the invention.

As shown in FIG. 1, the engagement chain 100 of the first embodiment the invention is used in an engagement chain type driving system E installed stationary on a working floor which lifts a lift table T on which an object not shown such as a heavy load is mounted and moved in parallel with the installation surface.

Figure 2:
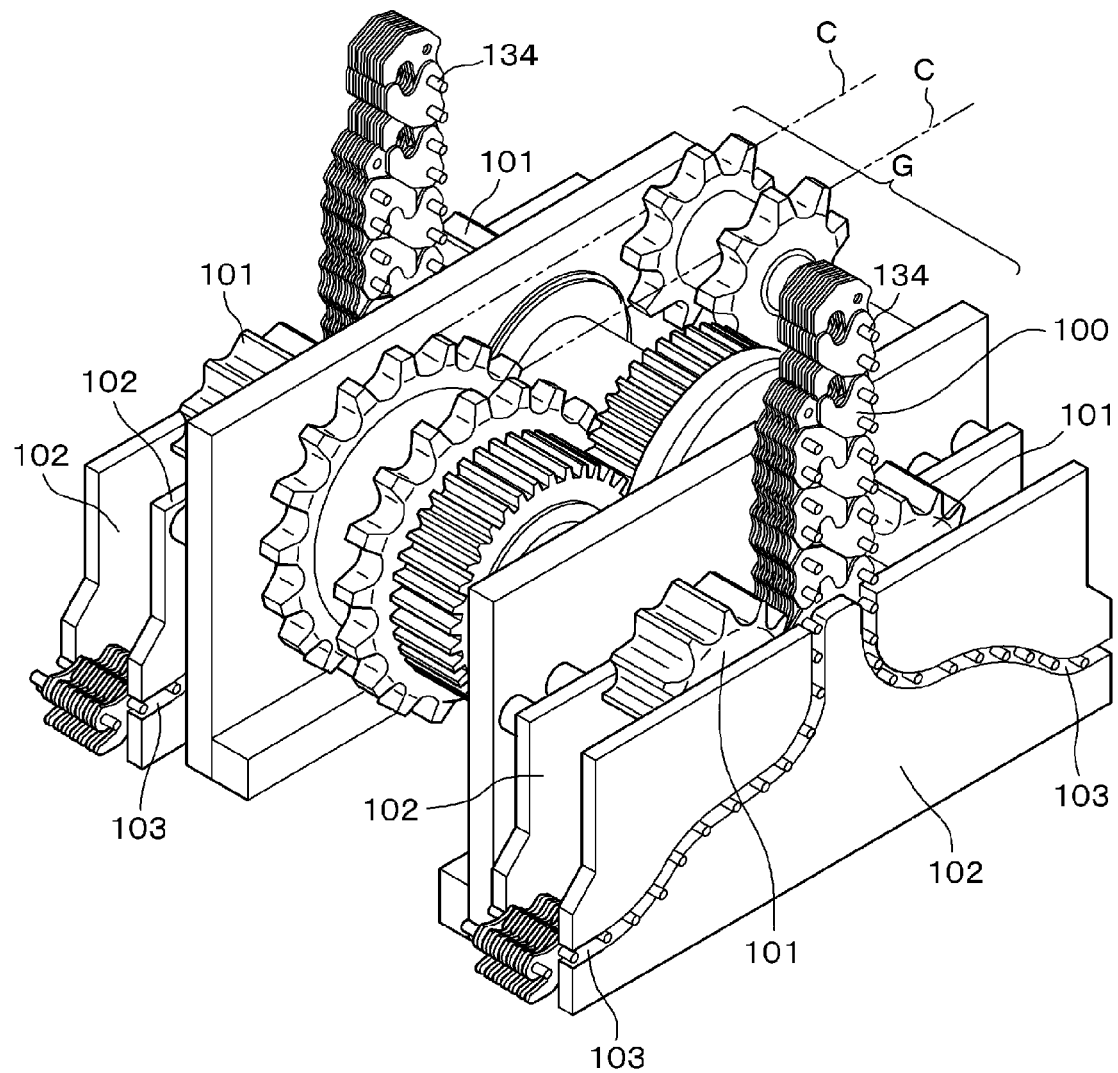
FIG. 2 is a perspective view showing a state in which a lift table and pantograph arms are removed from the configuration shown FIG. 1.

As shown in FIGS. 1 and 2, the engagement chain type driving system E described above has, as its basic structure, a base plate P installed on the installation surface from which the lift table T described above is lifted in parallel along with two pairs of driving sprockets 101. Each pair of driving sprockets face each other in the same plane centering on a pair of rotational axes which are parallel with the base plate P. The pair of driving sprockets rotate forward and reversely in opposite directions, causing the pairs of engagement chains 100 to move up or down and to move the lift table T as the pairs of engagement chains 100 engage and disengage with the driving sprockets 101. The lift table T is secured to upper ends of the engagement chains 100 and is lifted along with the engagement chains 100. A driving motor M drives the driving sprockets 101 and chain guides 102 having guide grooves 103 define traveling paths of the pairs of the engagement chains 100.

Further, as shown in FIGS. 1 and 2, the engagement chain-type driving system E includes a pair of driving-side sprockets D coaxially disposed on the side of an output shaft of the driving motor M, a pair of power transmission chains C composed of roller chains for transmitting power from the driving-side sprockets D to the pairs of the driving sprockets 101, a synchronizing gear group G for changing the speed of rotation of one direction from the pair of power transmission chains C and for transmitting the power to the pair of the driving sprockets 101 so that the driving sprockets rotate forward and in reverse in the opposite directions from each other. The engagement chain-type driving system E also includes a lift auxiliary guide means A provided between the lift table T and the base plate P on the side of the installation surface which has two upper and lower interlocked sections, each section being composed of arms of a pantograph in a shape of X, such as inner arms A1 and outer arms A2. Furthermore, the system E also includes slide rails R that slidably guide the reciprocal movement of lower ends of the inner arms A1 that move so as to correspond to lifting operations. The system also includes winding type chain storing boxes B for storing the pair of engagement chains 100 when the chains 100 are disengaged and divided from each other.

As shown in FIGS. 2-5, the engagement chain 100 of the first embodiment is constructed such that large numbers of outer and inner link plates 120 and 110 respectively having hook-like portions 121 and 111 are disposed without gap being formed therebetween in a chain width direction. The outer link plates 120 and inner link plates 110 and are flexibly connected by connecting pins 131 in a chain longitudinal direction such that back surfaces 125 of the hook-like portions 121 and 111 engage with the driving sprocket 101.

Thus the inner and outer link plates 110 and 120 that transmit the driving force in the chain longitudinal direction exist densely in a space occupied by the engagement chain 100 and there is no space required to transmit the driving force, so that the driving force per occupied space may be increased.

The outer link plates 120 arranged in a row in the chain width direction include guide plates 123 positioned on outermost sides in the width direction of the chain and intermediate plates 124 disposed in the same row between the guide plates 123, each having teeth 122 that engage with the driving sprocket 101 on a back surface 125 thereof. Each inner link plate 110 also has teeth 112 that engage with the driving sprocket 101 on a back surface 125 thereof. The inner link plates 110 are disposed alternately with the guide plates 123 and the intermediate plates 124 in the chain longitudinal and width directions.

It is noted that either of the teeth 122 and 112 provided on the back surfaces 125 of the intermediate plate 124 and the inner link plate 110 and engage with the driving sprocket may be cut.

Figure 7:
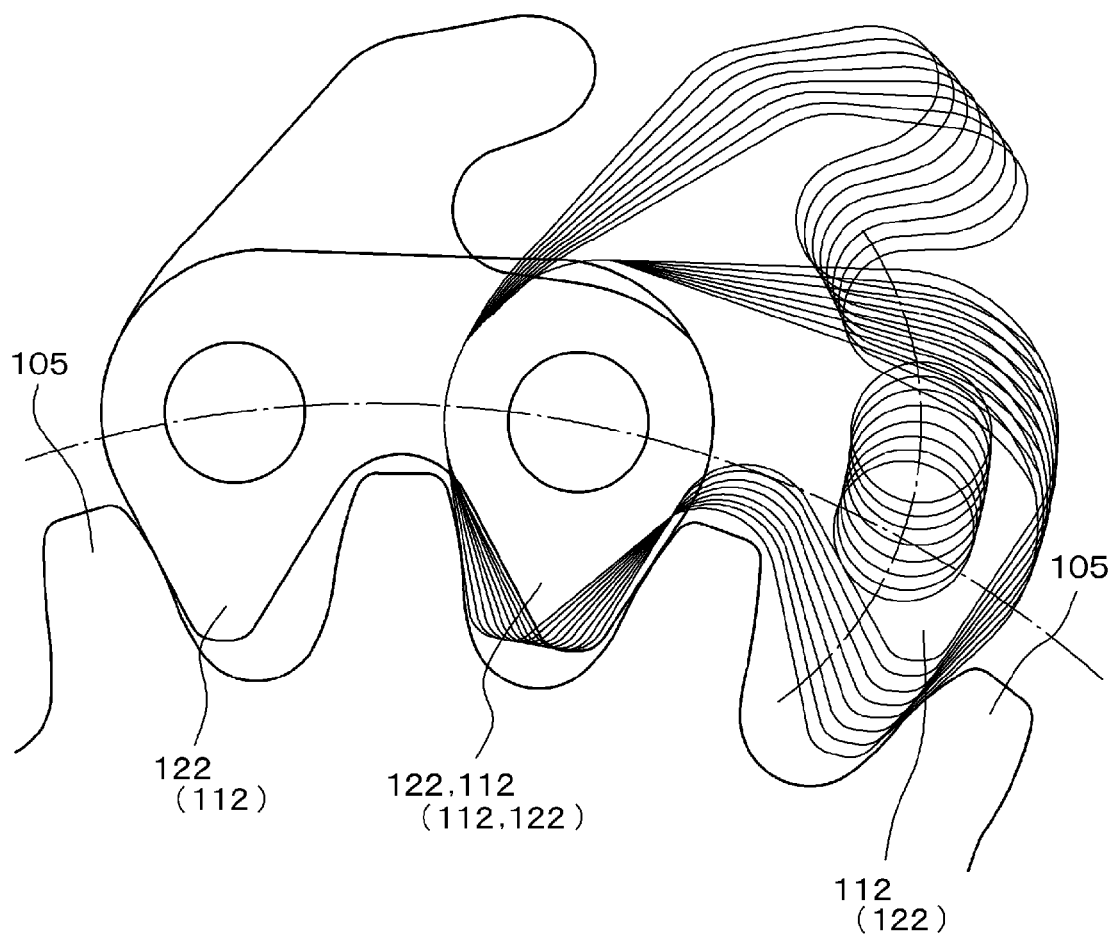
FIG. 7 is a diagram for explaining engagement of the engagement chain with a driving sprocket.
Figure 8:
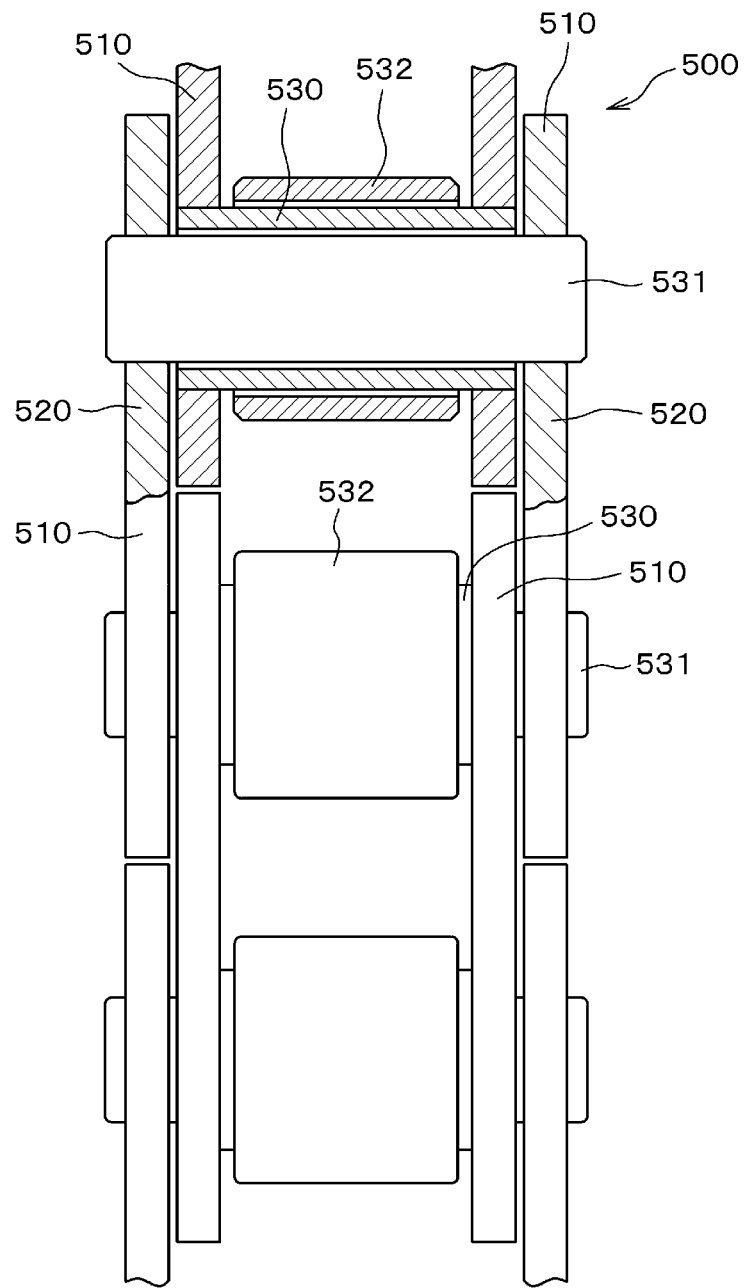
FIG. 8 is a partial sectional plan view of a engagement chain currently known in the art.
Figure 9:
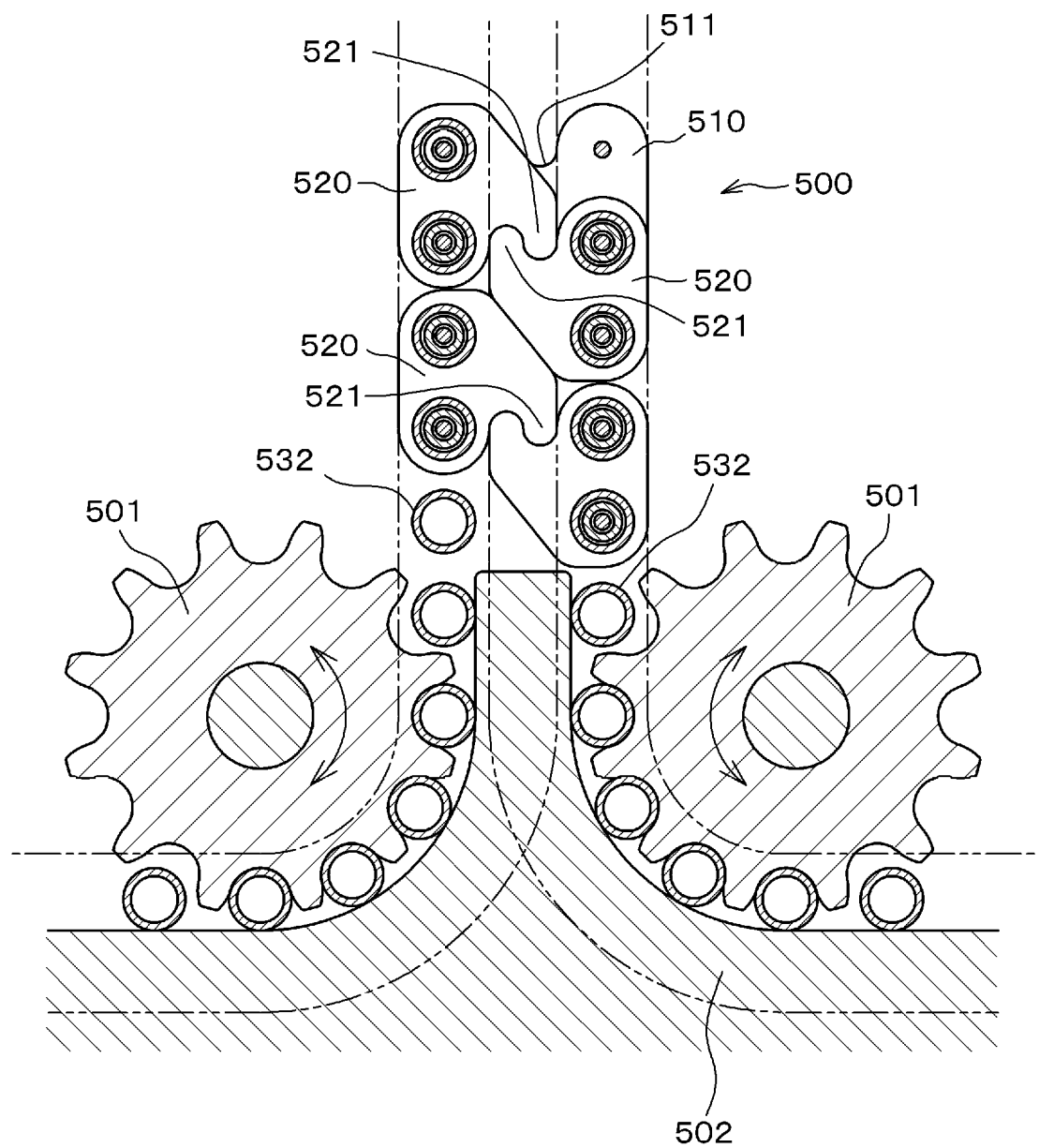
FIG. 9 is a diagram for explaining engagement of an engagement chain of FIG. 8 with a driving sprocket.

As shown in FIG. 7, the shape of the teeth 112 and 122 provided on the back of the intermediate plate 124 and the inner link plate 110 which engage with the teeth 105 of the driving sprocket are formed so that the teeth contact with the driving sprocket from a direction approaching a tangent direction during engagement, so that an engagement noise generated during when the teeth collide against the sprocket may be reduced.

Then, the hook-like portions 111 of the inner link plates 110 and the hook-like portions 121 of the intermediate plates 124 and guide plates 123 of one of the pair of engagement chains 100 engage with the hook-like portions 111 of the inner link plates 110 and the hook-like portions 121 of the intermediate plates 124 while the guide plates 123 of opposing chains 100 engage each other. This increases the rigidity along a plurality of rows in the chain longitudinal direction. Thus, buckling that is otherwise prone to be generated in the chain width direction of the engagement chain 100 may be steadily suppressed. Still more, the guide plates 123 guide the chain from right and left sides of the driving sprocket 101, so that accuracy of the engagement of the chain with the driving sprocket 101 is improved.

Figure 3:
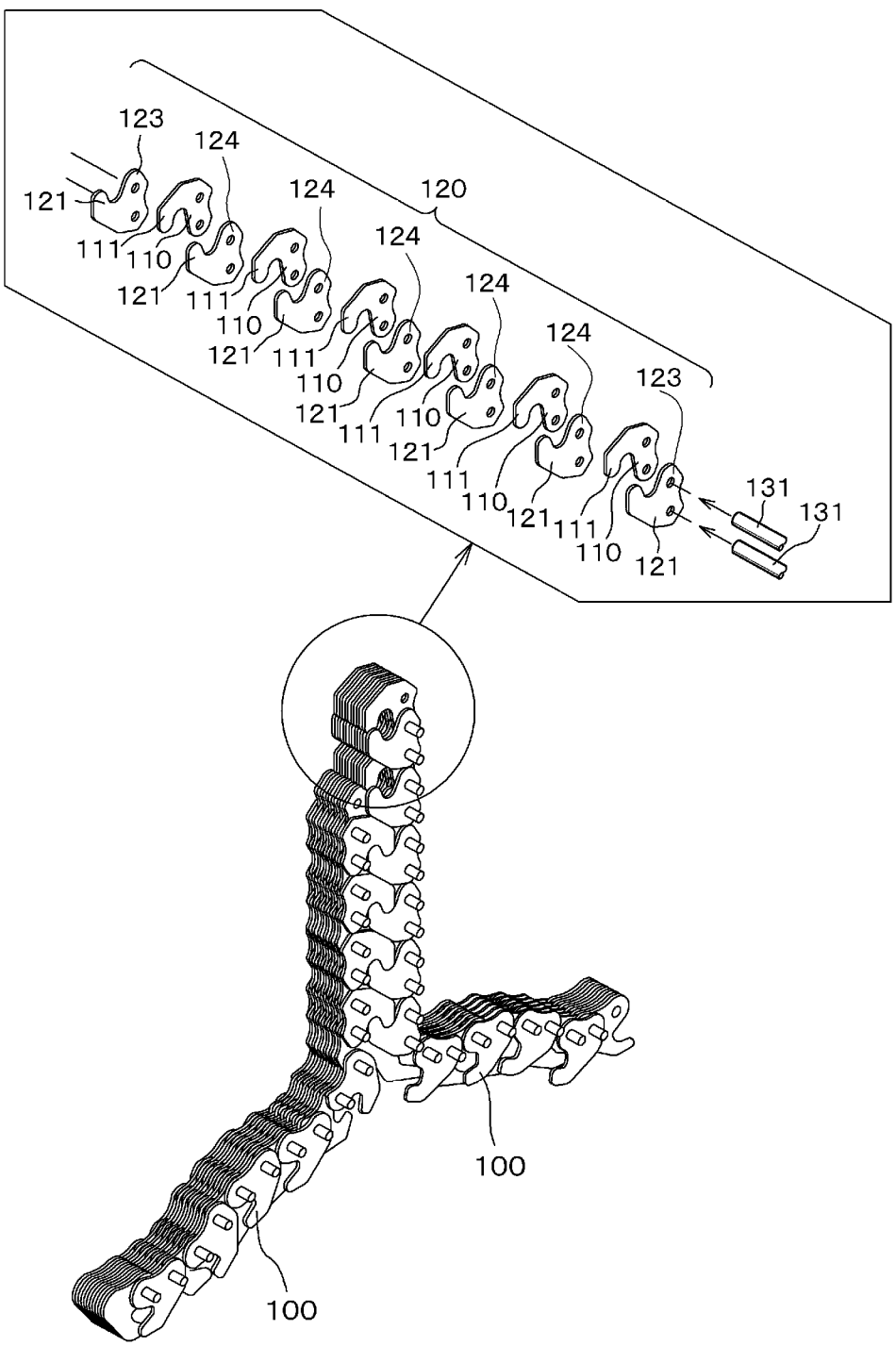
FIG. 3 is a partial enlarged view of the engagement chain of the first embodiment.
Figure 4:
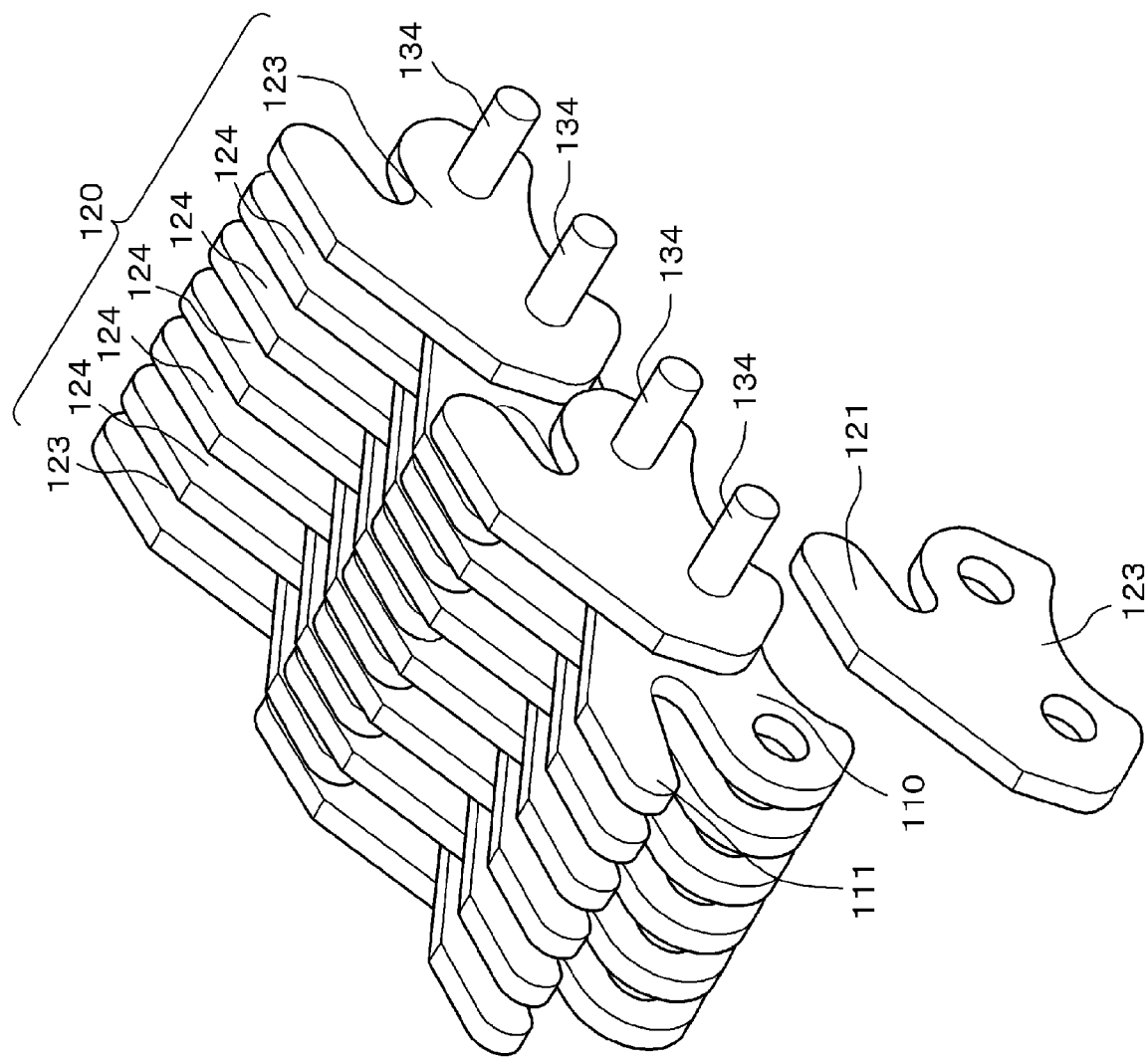
FIG. 4 is a perspective view when the engagement chain is seen from the side of the hook-like portion.
Figure 5:
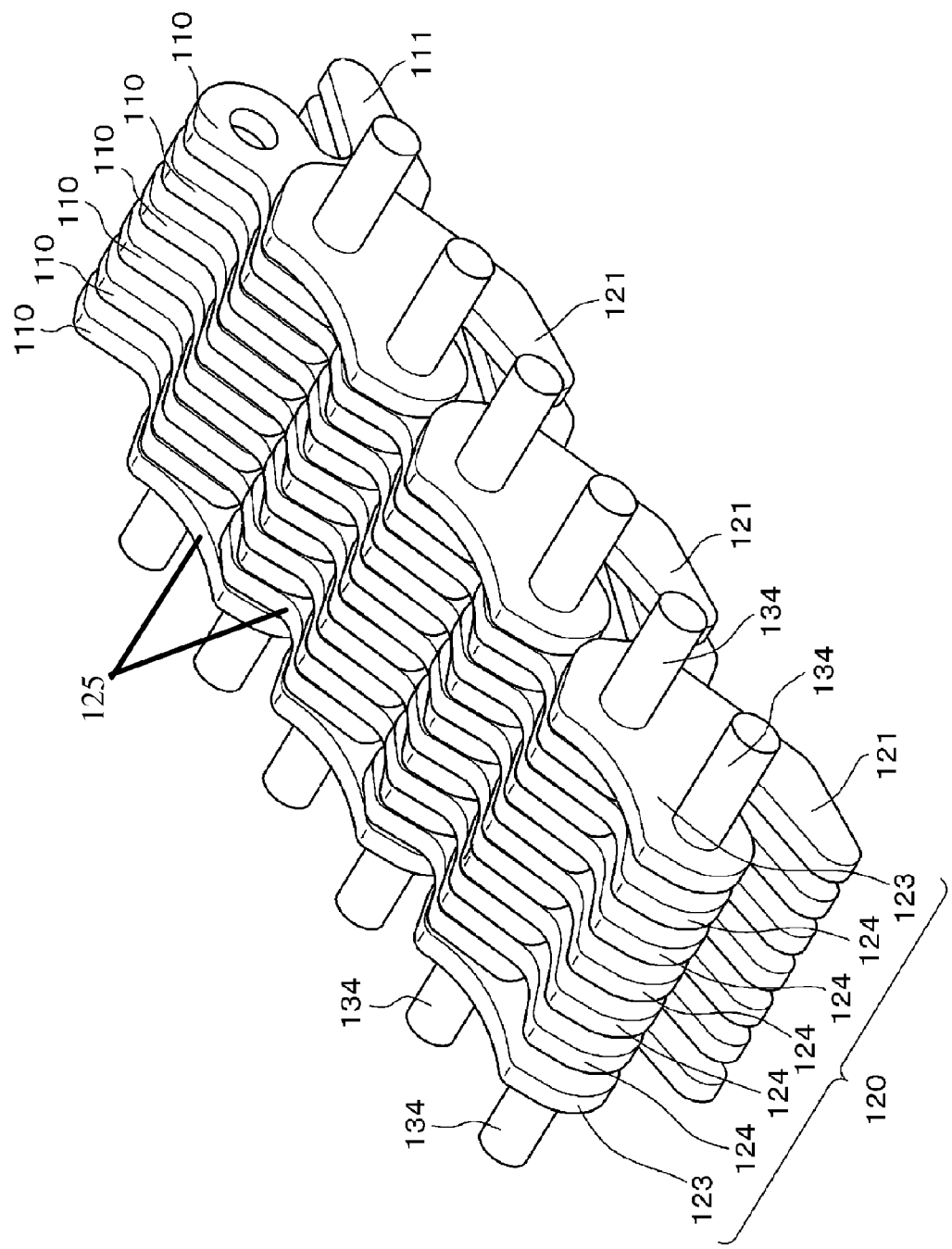
FIG. 5 is a perspective view when the engagement chain is seen from the back surface of the hook-like portion.

Still more, as shown in FIGS. 2 and 3, the pair of engagement chains 100 are arranged so that it rises together as an integrated unit as the chains 100 are moved from the horizontal to the vertical direction by engaging the hook-like portions 111 of the inner link plates 110 and the hook-like portions 121 of the intermediate plates 124 and opposing guide plates 123 while the hook-like portions face the pair of driving sprockets 101. The engagement chains 100 are also divided by disengaging the hook-like portions 111 of the inner link plates 110 and the hook-like portions 121 of the intermediate plates 124 and the guide plates 123 while deflecting the hook-like portions from pair of driving sprockets 101 as the chain moves from the vertical to the horizontal position.

Figure 6:
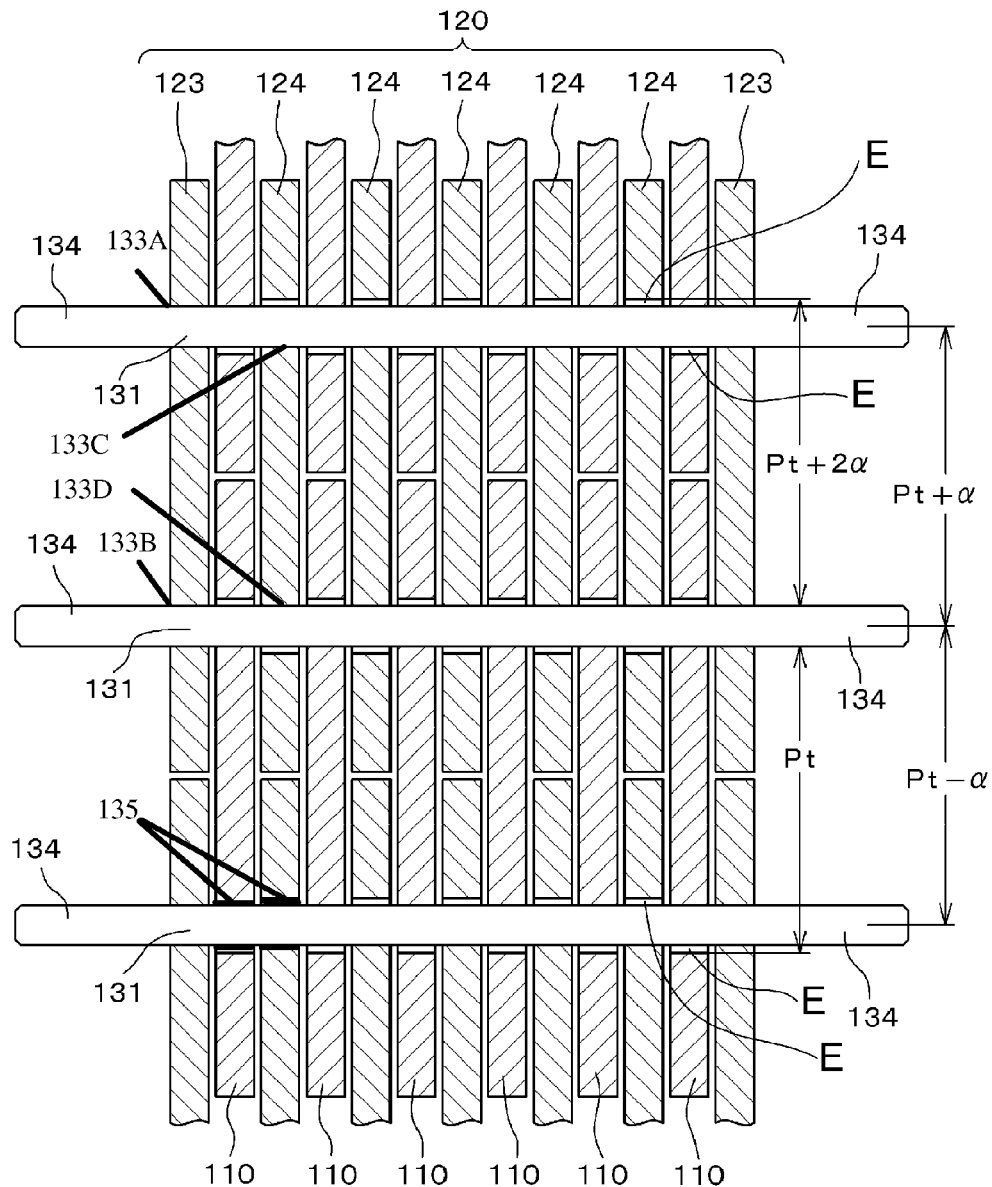
FIG. 6 is a section view of the engagement chain.

As shown in FIG. 6, the distance between a pair of pin holes 133A and 133B of the guide plate 123, i.e., a distance between the center axes of the connecting pins 131 fittingly secured to the guide plate 123, is set to be longer than a chain pitch Pt by a length .alpha. of a fitting gap E between the inner link plate 110 and the connecting pin 131 and the distance between a pair of pin holes 133C and 133D of the intermediate plate 124 is set to be longer than the distance Pt+.alpha. of the pair of pin holes 133A and 133B of the guide plate 123 by a length .alpha. of a fitting gap E.

Thereby, when the engagement chain 100 receives a compression force in the longitudinal direction, the inner link plates 110 and the intermediate plates 124 abut against the connecting pins 131 equally in the width direction, so that the force is equally transmitted in the chain, reducing stress and shearing force otherwise generated in a direction of bending the connecting pin. Still more, because the distance of the pair of connecting pins 131 of the guide plate 123 becomes Pt+α and the distance of the connecting pins 131 of the neighboring guide plate 123 becomes Pt−α, an average chain pitch when the engagement chain 100 receives the compression force in the longitudinal direction becomes Pt and the travel distance of the engagement chain 100 may be readily estimated from a degree of rotation of the driving sprocket 101. It is noted that the pitch is designed reversely from what described above when the engagement chain 100 is used in a mode in which a tensile load is applied in the longitudinal direction of the chain.

Still more, wear-resistant bushes 135 may be pressed into inner surfaces of the pair of pin holes of the intermediate plate 124 and the inner link plate 110 so that the bushes 135 directly slide against the connecting pins 131 in order to prevent wear of the intermediate plate 124 and the inner link plate 110, to maintain the equal contact of the intermediate plate 124 and the inner link plate 110 with the connecting pins 131 for a long period of time, and to reduce the stress and shearing force in the bending direction of the connecting pin 131 by transmitting the driving force equally.

Further, a length of each connecting pin 131 is set to be longer than the width of the engagement chain 100, so that projecting portions 134 are formed when the connecting pin 131 is fittingly secured to each guide plate 123, as shown in FIGS. 2 through 6.

The projecting portions 134 engage with the guide groove 103 of the chain guide 102 as shown in FIG. 2, so that the traveling path of the engagement chain 100 is defined and the accuracy of engagement of the engagement chain 100 with the driving sprocket 101 is improved, thus reducing the engagement noise otherwise generated during driving. It is noted that the projecting portion 134 may be provided with a roller, a cam follower or the like so that the projecting portion slides through the guide groove 103 more smoothly.

As described above, the invention brings about such remarkable advantages that the invention increases the driving force per occupied space of the chain, improves durability of the chain by reducing the stress and shearing force otherwise generated in the bending direction of the connecting pin and reduces the engagement noise generated during driving.

Other Embodiments

An engagement chain in a pair of the invention may be carried out in a variety of configurations without departing from the meaning and scope of the claims.

For example, the hook-like portions of the inner and outer link plates used in the engagement chain of the invention may have any shape as long as the plates of the same type facing to each other are capable of engaging and coupling with each other while being deflected in one direction by the sprockets and dividing and disengaging when being deflected in the opposite direction.

Still more, numbers of the inner link plates and intermediate plates disposed in the chain width direction in the engagement chain of the invention may be any number corresponding to the required driving force and an arrangement of the plurality of inner link plates and intermediate plates in the chain width direction may be arranged in any way as long as the driving force is applied equally to the connecting pin. That is, the inner link plates and intermediate plates may be disposed alternately by one each or by each plurality of plates.

Furthermore, the engagement chain type driving system into which the engagement chain of the invention is built may be installed on a floor surface so as to be a stationary mode system, installed from a ceiling so as to be a suspended mode system or installed on a vertical wall surface so as to be a cantilever supporting mode system.

What is claimed is:

1. A forward and backward driving device comprising:
    a sprocket
    a chain guide; and
    engagement chain including a pair of individual engagement chains which are configured so as to engage and disengage with each other, each individual engagement chain comprising:
        a plurality of outer and inner link plates, each having a hook-shaped portion, which are connected together in a chain longitudinal direction by connecting pins, each of the plurality of outer and inner link plates further comprising an engagement tooth on a back surface of each of the plurality of outer and inner link plates for engaging with one of a pair of driving sprockets,
        wherein the pair of individual engagement chains are engaged and disengaged as the hook-shaped like portions of each individual engagement chain engage with each other when driven by the pair of driving sprockets which engages with the engagement tooth of the back-surface of each of the outer and inner link plates, causing the pair of individual engagement chains to engage and disengage with each other, respectively,
        wherein the outer link plates are positioned in outermost sides in a row in the chain width direction and comprise guide plates and intermediate plates which are disposed between the guide plates, and wherein the inner link plates are disposed alternately with said guide plates and intermediate plates in the chain longitudinal and width directions, and
        wherein the connecting pin has guide portions that project out of said guide plate, the guide portions consisting of projecting portions formed on the connecting pins which engage with a guide groove of the chain guide when the pair of individual engagement chains are disengaged with each other.

2. The forward and backward driving device according to claim 1, wherein a distance between a pair of front and rear pin holes of the intermediate plates is set to be longer than the distance of the pair of front and rear pin holes of the guide plates by a length of a fitting gap between the intermediate plate and the connecting pin.

3. The forward and backward driving device according to claim 1, wherein wear-resistant bushes are pressed into inner surfaces of a pair of pin holes of said intermediate plate and inner link plate so that the bushes directly slide against the connecting pins.

4. The forward and backward driving device according to claim 1, wherein a distance between a pair of front and rear pin holes of the guide plates is set to be longer than a chain pitch by a length of a fitting gap between the inner link plate and the connecting pin.

5. A forward and backward driving device comprising:
   a sprocket
   a chain guide; and
   engagement chain including a pair of individual engagement chains which are configured so as to engage and disengage with each other, each individual engagement chain comprising:
      a plurality of outer and inner link plates, each having a hook-shaped portion and a teeth portion formed on the opposite surface of the hook-shaped portion along with a pair of pin holes,
      a plurality of connecting pins connect the outer and inner link plates together in a chain longitudinal direction by being disposed in the pin holes of the outer and inner link plates,
   wherein the pair of individual engagement chains are engaged and disengaged as the hook-shaped like portions of each individual engagement chain engage with each other when driven by a pair of driving sprockets which engage with the teeth portion of the outer link plates, causing the pair of individual engagement chains to engage and disengage with each other, respectively,
   wherein the outer link plates are positioned in outermost sides in a row in the chain width direction and comprise guide plates and intermediate plates which are disposed between the guide plates, and wherein the inner link plates are disposed alternately with said guide plates and intermediate plates in the chain longitudinal and width directions, and
   wherein the connecting pin has guide portions that project out of said guide plate, the guide portions consisting of projecting portions formed on the connecting pins which engage with a guide groove of the chain guide when the pair of individual engagement chains are disengaged with each other.

6. The forward and backward driving device according to claim 5, wherein a distance between a pair of front and rear pin holes of the intermediate plates is set to be longer than the distance of the pair of front and rear pin holes of the guide plates by a length of a fitting gap between the intermediate plate and the connecting pin.

7. The forward and backward driving device according to claim 5, wherein wear-resistant bushes are pressed into inner surfaces of a pair of pin holes of said intermediate plate and inner link plate so that the bushes directly slide against the connecting pins.

8. The forward and backward driving device according to claim 5, wherein a distance between a pair of front and rear pin holes of the guide plates is set to be longer than a chain pitch by a length of a fitting gap between the inner link plate and the connecting pin.

\* \* \* \* \*